United States Patent [19]
Martinez

[11] 3,880,064
[45] Apr. 29, 1975

[54] APPARATUS FOR MAKING TORTILLAS AND THE LIKE

[76] Inventor: Maria Navar Martinez, 7557 N. Loop Road, El Paso, Tex. 79905

[22] Filed: Feb. 27, 1974

[21] Appl. No.: 446,237

Related U.S. Application Data
[63] Continuation-in-part of Ser. No. 263,091, June 15, 1972, abandoned.

[52] U.S. Cl. .................... 99/349; 99/372; 219/524
[51] Int. Cl. ............................................. A47j 37/00
[58] Field of Search ...... 219/524, 525; 99/349, 352, 99/353, 372, 374, 375, 376, 378, 379, 380, 381, 382, 383, 384, 422; 100/93 P, 257

[56] References Cited
UNITED STATES PATENTS

| | | | |
|---|---|---|---|
| 1,655,192 | 1/1928 | Murphy | 99/379 |
| 1,822,314 | 9/1931 | Reichold | 99/378 |
| 1,891,825 | 12/1932 | Martell et al. | 99/379 |
| 2,009,791 | 7/1935 | Shroyer | 99/379 X |
| 2,039,218 | 4/1936 | Gouoroff | 99/379 |
| 2,099,152 | 11/1937 | Walder | 99/372 X |
| 2,520,997 | 9/1950 | Cavanagh | 99/372 |
| 2,632,379 | 3/1953 | Kudo | 99/379 X |
| 2,719,903 | 10/1955 | Oertli | 219/525 |
| 2,980,012 | 4/1961 | Ramirez | 99/353 |
| 3,177,023 | 4/1965 | Nuckols | 99/372 X |
| 3,312,161 | 4/1967 | Nanna | 99/372 X |
| 3,397,655 | 8/1968 | Valadez et al. | 99/372 X |
| 3,490,358 | 1/1970 | Bardeau et al. | 99/380 |

FOREIGN PATENTS OR APPLICATIONS

| | | | |
|---|---|---|---|
| 150,821 | 5/1950 | Australia | 219/524 |
| 386,488 | 5/1922 | Germany | 99/375 |

Primary Examiner—Billy J. Wilhite
Attorney, Agent, or Firm—Hill, Gross, Simpson, Van Santen, Steadman, Chiara & Simpson

[57] ABSTRACT

This invention provides an apparatus or appliance for simultaneously flattening and spreading flour dough patties into a set, partially or completely, cooked condition without heretofore required rolling of the dough. The apparatus is especially suited for home use in making of tortillas, crepes, wafers, and the like thin sheet pastries and includes a base for resting on a counter or table-top presenting an electrically heated base plate to receive the dough patty and a bar hinged to the base suspending an electrically heated lid plate to provide a lever of the second class for pressing the lid plate against the dough patty on the base plate with minimum manual effort to produce a wafer sheet of the desired thinness. The manual effort is applied with a quick pressing motion on a handle which may be pivoted on the bar or may be an extension of the bar, the pressure is released to allow vapors to escape from the flattened patty and the lid plate may be suspended for a short time over the patty until the desired cooking is completed whereupon the handle is raised to lift the lid plate away from the base plate and the set wafer sheet is then removed to another location for cooking or cooling. The bar applies pressure to the center of the lid plate permitting this plate to slightly tilt or wobble for application of uniform pressure and the base can have a rearwardly extending foot to prevent tilting which can also be clamped to the counter or tabletop while the bar can have an overlying rearwardly extending second handle portion to be pressed downwardly to prevent tilting of the base.

15 Claims, 8 Drawing Figures

PATENTED APR 29 1975
3,880,064
SHEET 1 OF 2

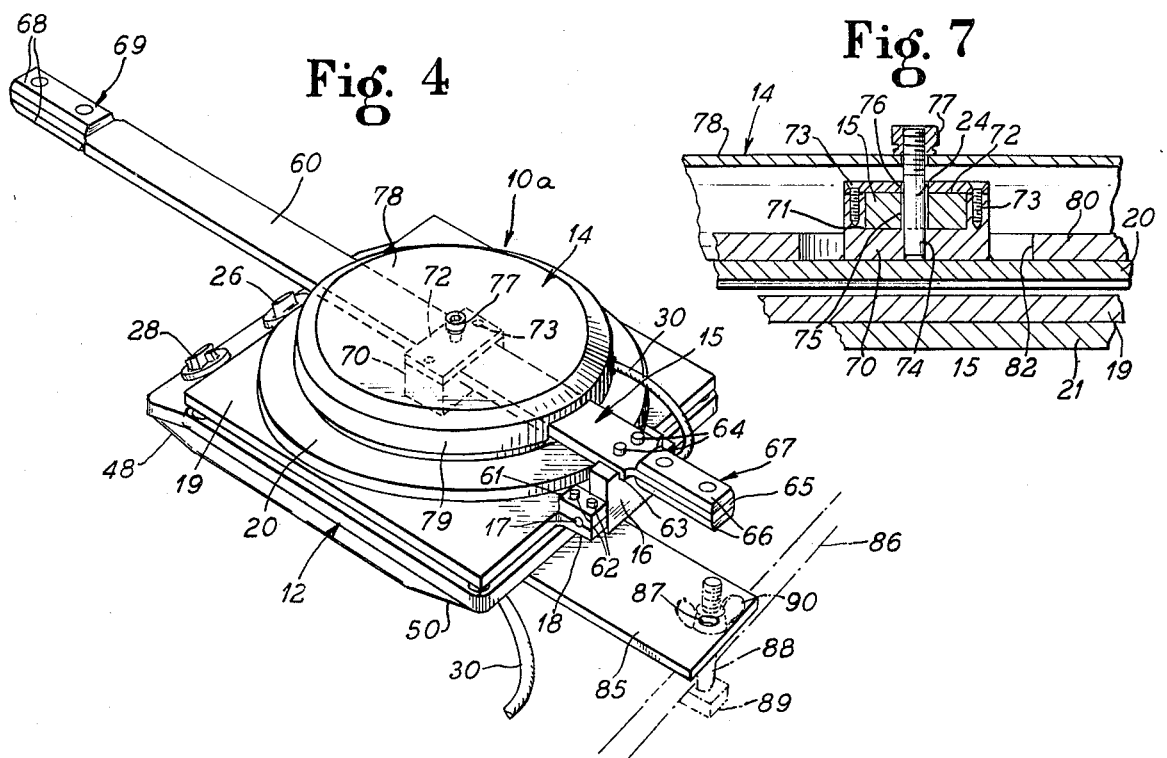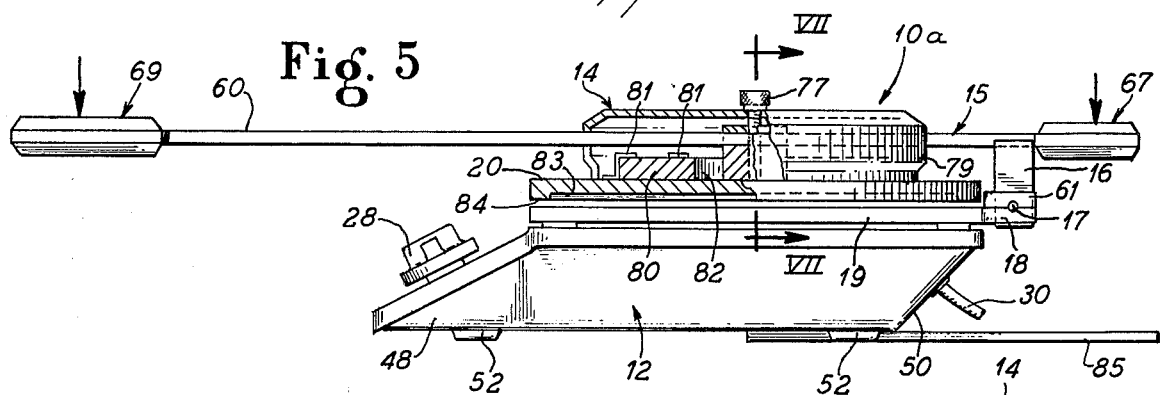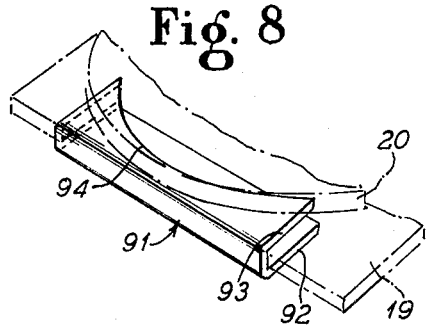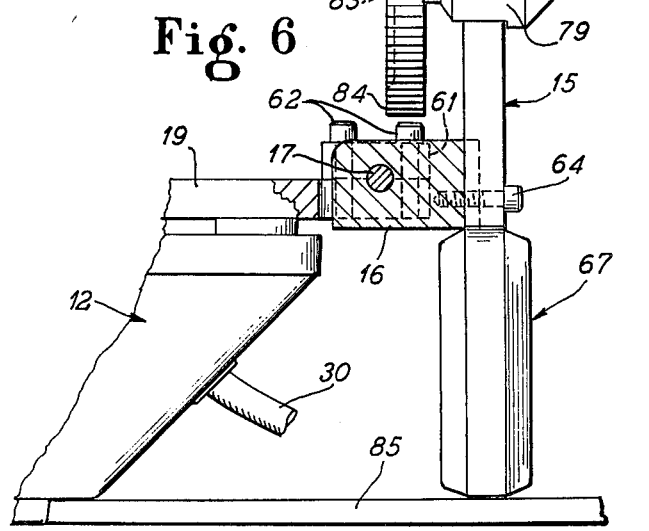

APPARATUS FOR MAKING TORTILLAS AND THE LIKE

RELATED APPLICATION

This application is a continuation-in-part of my application entitled, "Apparatus for Making Tortillas and the Like", Ser. No. 263,091 filed June 15, 1972 now abandoned.

BACKGROUND OF THE INVENTION

1. Field of the Invention

This invention relates to an apparatus, especially suited for home use, for making thin pastries such as tortillas without heretofore required rolling of the dough and more particularly relates to a portable electrical appliance which will spread, flatten, and partially or completely cook flour dough patties into a set wafer-thin condition by a quick pressing operation requiring only minimum manual effort.

2. Description of the Prior Art

In the traditional manner of making tortillas and other thin wafer-like pastries from a kneaded, flour-based dough, a dough patty about the size of a biscuit is rolled by hand with a rolling pin over a board or other smooth surface until the desired shape and thickness is obtained. During this rolling operation, it is necessary to "dust" the dough or board with flour periodically to prevent the dough from adhering to the rolling pin. Unfortunately, the taste of flour can then be detected in the finished product. The manual task of rolling and forming the tortillas is extremely laborious and time consuming.

In attempting to lessen the burden of rolling and forming tortillas, machines and devices have been developed. In a typical machine, the rollers are used somewhat similar to the old washing machine rollers to flatten the dough. When the dough is flattened there are two additional steps of cutting the flattened dough to a desired shape and then cooking the tortillas.

There are other machines and devices which have been designed to make tortillas in a conveying line assembly where dough patties or dough in unit amounts are received, compressed to a desired size, partially cooked and delivered from the machine. However, these machines are too extensive and expensive to be used in the home or in small operations such as restaurants, and accordingly, are not practical for most users of machines for making tortillas and other similar dough products.

Therefore, it would be advantageous if an apparatus were developed wherein flour tortillas and other similar flour-based products could be easily made and with little effort and time. Such apparatus would be most desirable if it could eliminate heretofore required rolling operations and directly form and partially cook flour tortillas to a set condition in one operation.

SUMMARY OF THE INVENTION

To overcome the disadvantages of the prior machines and devices and the laborious and time-consuming hand method of rolling flour tortillas, I have developed an apparatus or appliance especially suited for home use to simultaneously flatten and spread, form and partially or completely cook flour tortillas and the like pastries. According to this invention, a base for convenient mounting on a tabletop or counter has an electrically heated top plate and a handle operated swingable lid with an electrically heated centrally suspended plate. The handle is arranged to apply leverage to the suspended plate for pressing tortilla dough patties mounted on the base plate at high pressures with only minimum manual effort. The handle may be swingably mounted on a bar pivoted to the base, suspending the lid, and have a lip engaging base plate to exert leverage when the handle is pressed downwardly or, in a more preferred embodiment, may be an extension of the bar and projecting for a considerable distance forwardly from the base to be grasped at its end to exert the downward pressure loading of the top or lid plate through a lever arm advantage of a lever of the second class. Separate heating elements for the base and top plates are individually controlled from switches on the base and the base is preferably equipped with rubber or felt pads to prevent slipping. In addition, the base may have a rearwardly extending flat foot easily attached to a countertop to fixedly lock the base against tilting or slipping and the handle may have a rearward extension overlying this foot to be grasped simultaneously with the operating end of the handle for exerting a downward pressure on both the front and rear of the base to prevent tilting.

In operation of the apparatus or appliance of this invention, the cover or lid is swung to an open vertical position about is pivot on the base, the switches are adjusted to heat the base and top plates to the desired temperature, and dough patty is deposited on the center of the base plate, the handle is grasped to swing the cover or lid about the pivot causing the top plate to be pressed against the dough patty. The pressure on the handle is exerted with a quick motion flattening the patty to a thin wafer sheet before the dough is cooked or baked, the pressure is then released to allow steam to escape from the cooking patty and during this cooking operation the lid may be slightly lifted to relieve part of the weight of the cover or lid assembly from the sheet being baked. The handle is then lifted to swing the cover or lid back to its open vertical position and the partially or completely baked sheet is removed from the base plate. The entire operation only takes a few seconds and pressures in excess of 60 pounds are easily applied to the patty with a minimum manual downward pressure on the operating handle. A preferred handle length for the bar-type handle is about 28–30 inches.

It is then an object of this invention to provide an electrical appliance for simultaneously flattening, spreading, forming, and partially baking flour tortillas and the like pastries.

Another object of the invention is to provide an electrical appliance which eliminates heretofore required rolling of dough patties to form thin wafer sheets of pastries such as tortillas.

Another object of the invention is to provide an electrical appliance for home use in the making of flour tortillas and the like having a base conveniently mounted and clamped on a tabletop carrying an electrically heated horizontal top plate and pivotally mounting a bar on which is suspended a top electrically heated plate cooperating with the base plate to press a dough patty on the base plate into a thin sheet by means of a handle on the bar which is conveniently grasped and depressed downwardly to exert great pressures on the dough patty.

Another object of this invention is to provide an electrical appliance having separately heated opposed plates, one carried by a base and the other suspended from a bar pivoted on the base and having a hand grasped handle portion exerting a multiplying lever action on the suspended plate to exert great pressures on a dough patty mounted on the base plate.

Another object of this invention is to provide an electrical appliance for flattening dough patties which can be conveniently clamped to a countertop or table.

Other and further objects of this invention will be apparent to those skilled in this art from the following detailed description of the attached sheets of drawings which, by way of preferred examples only, illustrate two embodiments of the invention.

BRIEF DESCRIPTION OF THE DRAWINGS

FIG. 4 is a perspective view of another embodiment of the invention showing the appliance in closed position and clamped to a countertop;

FIG. 5 is a side elevational view of the appliance of FIG. 4;

FIG. 6 is an enlarged fragmentary side elevational view with a portion in cross section, showing the appliance in fully opened position;

FIG. 7 is a fragmentary enlarged vertical cross sectional view taken along the line VII—VII of FIG. 5, showing the manner in which the lid is suspended from the operating handle; and FIG. 8 is a fragmentary perspective view showing a shim mounted on an edge of the bottom plate to space the top plate against full closing on the bottom plate.

BRIEF DESCRIPTION OF THE PREFERRED EMBODIMENTS

Figure 1:
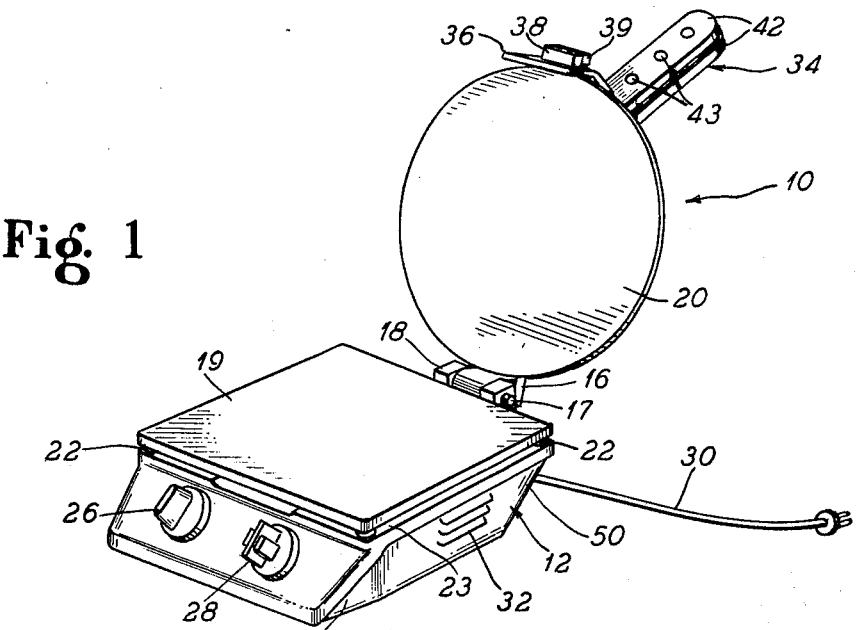
FIG. 1 is a perspective view of an electrical appliance or apparatus of this invention in an open position.
Figure 2:
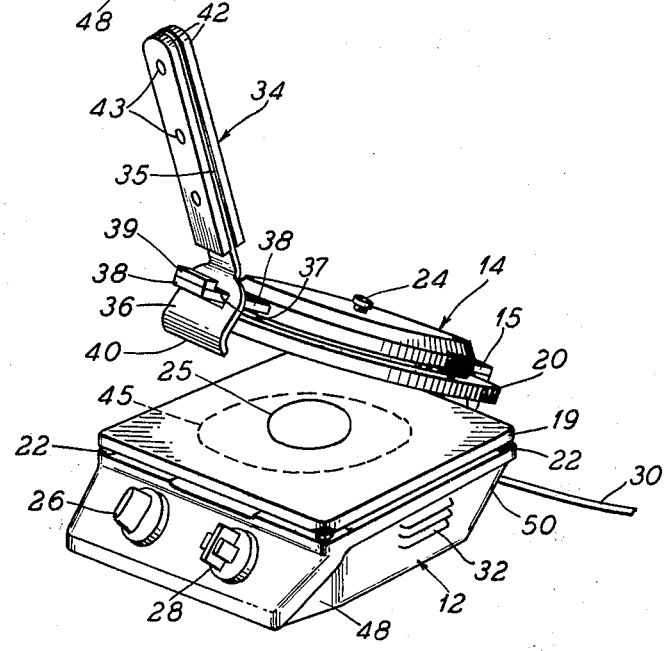
FIG. 2 is a view similar to FIG. 1 illustrating the size and form of a dough patty before and after being flattened, formed and partially cooked by the apparatus.
Figure 3:
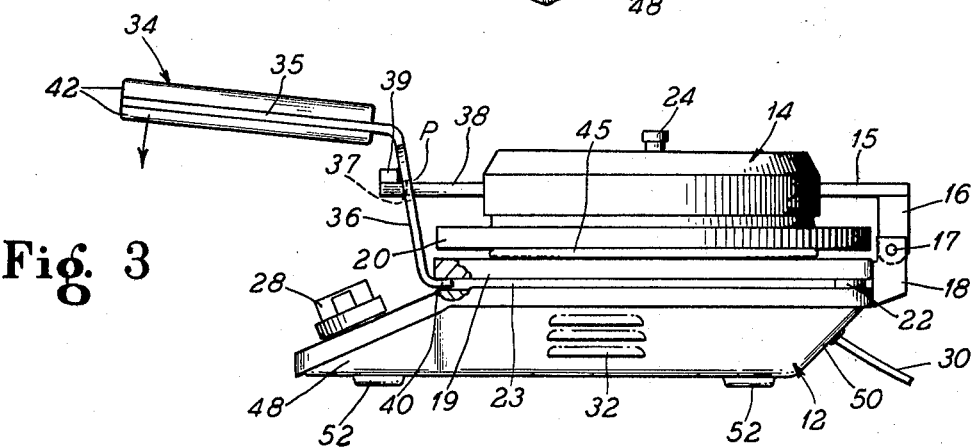
FIG. 3 is a side elevational view of the apparatus of FIGS. 1 and 2 in a closed position illustrating the flattened dough product between the base and lid of the apparatus.

The apparatus or appliance 10 of the embodiment of FIGS. 1 to 3 comprises a horizontal base heating unit 12 and a top swingable heating unit 14 suspended from a bar 15 mounted on its rear end on a pivot block 16 which is connected by a pin 17 to ears 18 extending from the rear of the base member 12.

The base 12 has a flat horizontal top base plate 19 mounted thereon. The swingable lid 14 has a top plate 20 suspended therefrom. These plates 19 and 20 are composed of heat conductive metal such as aluminum and may be smooth surfaced, ribbed, or may have a slight recess to shape and determine the thickness of the sheet flattened from a dough patty. The base plate 19 is illustrated as being square in shape but it may have any suitable configuration and it is preferably mounted by a support member 22 on the base heating unit 12 in slightly raised position above the top wall of the base forming a space 23 therebetween.

The top or swingable plate 20 is illustrated as having a circular shape of larger diameter than the lid 14 but it too may have any desired shape and size.

A central bolt 24 suspends the top plate 20 from the bar 15 so that the plate can tilt a few degrees about a horizontal axis perpendicular to the axis of the bar 15. The suspension mounting will be hereinafter more fully described in connection with FIGS. 4 to 6.

The plates 19 and 20 are heated by electrical heating elements, also hereinafter more specifically described in connection with FIGS. 4 to 6, under the control of switches 26 and 28 on the front face of the base 12. The heating units are energized from a single electric wire cord 30 and have chromalax elements preferably of one-thousand watts rating for use with standard 110-120 volt current.

The base unit 12 has vents 32 for air cooling the electrical heating elements therein.

In the embodiment of FIGS. 1 to 3, a handle 34 with an elongated leverage portion 35 has a downturned connecting portion 36 with a slot 37 receiving the forward extension 38 of the bar 15 and a stop pin or lug 39 is provided on the end of this bar section 38 to hold the handle on the bar. The top leverage portion 35 of the handle swings back at an angle of about 40 degrees when the top plate 20 is in the open position of FIG. 1.

The bottom of the connecting portion 36 of the handle has an inturned lip 40 adapted to fit into the space 23 between the base plate 19 and the top of the unit 12 when the lid or cover unit 14 is lowered to the closed position shown in FIG. 3. The handle portion 34 is covered with non-heat conductive strips 42 secured thereon by countersunk rivets or bolts 43 so that it may be comfortably manually grasped and pressed downward as shown by the arrow in FIG. 3, thereupon pivoting the portion 36 at P downwardly against the extension 38 of the bar 15 and since the lip 40 is held under the fixed plate 19, this downward pressure will exert an increased downward pressure on the forward end of the bar 38 pressing a dough patty 25 on the base plate 19 into a thin, flat sheet 45. If the plates 19 and 20 have been heated to temperatures controlled by the switches 26 and 28, the wafer or sheet 45 will be quickly baked or cooked to set the dough and form a self-sustaining tortilla or other thin pastry. The patty 25 can be composed of any suitable dough recipe which, in the case of tortillas is composed generally of flour, baking powder, salt, shortening, and water or milk and has a size to afford sufficient dough for forming a tortilla about one-eighth inch thick with a diameter of about 7 to 9 inches. Only a few seconds, such as two or three seconds are required to flatten and spread, form, and bake the tortilla dough to a set thin wafer sheet. The downward pressure on the handle 34 is only momentarily applied, the handle is then released and sometimes partially raised to allow steam to escape from the flattened wafer being baked and then after a short baking period, the upper heating unit 14 is swung to the open position of FIG. 1 by lifting the handle 34 and removing the lip 40 from the space 23 under the plate 19. A partially cooked tortilla 45 is then easily removed from the base heating plate 19 and either stored in a refrigerator until ready to be eaten or immediately placed on a griddle of a stove, for example, to complete the cooking or baking. In the finished cooking or baking of the tortilla, a little pressure may be applied with a spatula or wooden press.

The base 12 has a forwardly extended portion 48 beyond the plate 19 providing a panel for the switches 26 and 28 and also providing a support under the handle 34 which will resist tilting of the unit when downward pressure is applied to the handle. The rear end of the base 12 is forwardly sloped at 50. Felt or rubber pads 52 are mounted on the bottom of the unit 12 under the forward projecting portion 48 and just forwardly from the bottom edge of the sloping rear end 50 of the base. These pads 52 will grip a countertop or table on which the base is mounted to prevent slipping and marring of the table and also to assist in holding the unit against tilting when downward pressure is applied on the handle 34.

From the above descriptions it should be understood that ths unit 10 is an electrical appliance with electrically heated base and top plates and with an operating handle providing a lever advantage for pressing the top plate against a dough patty on the bottom plate to quickly and easily flatten and spread the dough into a thin wafer sheet.

In the embodiment 10a of FIGS. 4 to 7, parts identical with parts described in FIGS. 1 to 2 have been marked with the same reference numerals and function in the same manner as described in connection with FIGS. 1 to 3. In the embodiment 10a, however, the bar 15 has an integral greatly elongated extension 60 projecting forwardly from the movable heating unit 14 instead of the short extension 38 and the pivotally mounted handle 34 is eliminated. The pivot block 16 receives the pivot pin 17 therethrough the pin 17 is held on the ears 18 by covering bearing blocks 61 secured to the ears by screws 62. The block 16 has a recess 63 in its top end receiving the bar 15 and screws 64 secure the bar in the recess of the block. The bar 15 has a rearward extension 65 covered with nonconducting insulating strips 66 to provide a handle grip 67 rearwardly of the pivot 17. As shown, the bar extends over the top of the top plate 20 and forwardly at 60 a substantial distance to an operating end with insulating strips 68 thereon providing a second hand grip 69.

A mounting block 70 is secured, as by welding, to the top face of the top plate 20 at the center of the plate and has a top recess 71 receiving the bar 15 therethrough. A cover plate 72 held on the top of the block 70 by screws 73 overlies the bar 15 and clamps it in the recess 71. The bolt 24 is anchored at 74 in the base of the block 70 and extends through a hole 75 in the bar and a hole 76 in the cover 72 to project therefrom to a threaded end receiving a nut 77 thereon. This nut 77 is bottomed on a metal cover 78 with a depending peripheral skirt 79 resting on the top plate 20 and having front and rear slots receiving the bar 15 therethrough.

An annular heating element 80 is clamped on the top face of the top plate 20 by means of peripheral clamps 81 secured by screws or the like to the top plate and this heating element has a central aperture 82 surrounding the mounting block 70 in spaced relation as shown in FIG. 7. The cover 78 overlies and surrounds this heating element 80.

As shown in FIG. 5, the top plate 20 has a recess 83 surrounded by a peripheral ridge or flange 84 which rests on the top face of the base plate 19 thereby gauging the thickness of a tortilla or the like wafer to be formed between the plates. The recess 83 is generally not more than about one-eighth inch deep.

The heating element for the bottom plate 19 is shown at 21 in FIG. 7 underlying the plate and both of the heating elements 21 and 80 are energized from the electric cord 30.

As shown in FIGS. 4 and 6, the bottom of the base unit 12 has secured thereon a flat rigid metal plate 85 which extends rearwardly from the sloping rear wall 50 of the base under the pivot 17 and its mounting and under the rear handle 67 of the bar 15. This plate provides a foot for the base 12 which can be clamped to a counter or tabletop 86 as shown in FIG. 4. As there shown, the plate 85 has a hole 87 through its rear end and a bolt 88 with a head 89 underlying the tabletop 86 and a threaded end extending through the hole 87 and receiving a wing nut 90 that can be tightened to secure the plate to the tabletop. Alternately, a wood screw could be inserted through the hole 87 and threaded into the tabletop or other mounting base for a fixed mounting of the base unit 12.

As shown in FIG. 6, when the movable top or lid assembly 14 is swung to an upright position, the rearwardly extending handle grip 67 of the bar rests on the foot 85 so that the top unit 14 may rest in a vertical open position.

To operate the modified apparatus or appliance 10a, a dough patty is placed on the base plate 20 in the same manner as described in connection with the appliance of FIGS. 1 to 3, the plates 19 and 20 are heated by their heating elements to the desired temperature under the control of the switches 26 and 28, and the top unit 14 is swung from its vertical open position of FIG. 6 by swinging the bar 15 to a horizontal position as shown in FIGS. 4 and 5. The hand grips 67 and 69 are manually grasped and downward pressure is applied to both grips. Because of the length of the handle portion 60, a lever advantage is obtained and the plate 20 will be forced against the dough patty with great pressure even though relatively small amounts of manual pressure are exerted on the handles. The manual pressure on the handle 67 need only be sufficient to prevent the base unit 12 from tipping. Of course, the grip 67 need not be used if the foot 85 is secured to a fixed base such as a tabletop or counter 86. Since the pressure is applied to the top plate 20 through the mounting block 70 from the bar 15 and since this mounting block is at the center of the plate 20, and since the bolt 24 fits rather freely through the holes 75 and 76 in the bar 15 and cover 72, the plate 20 can tilt to a very limited extent for accommodating any unevenness in the thickness of the dough patty and insuring the production of a thin wafer sheet of uniform thickness.

Instead of providing a recess 83 in the plate 20 to gauge the thickness of the wafer sheet to be formed or to increase the thickness of the sheet, as shown in FIG. 8 a shim clip 91 can be snapped over the front edge of the base plate 19. This clip 91 is U-shaped in cross section having a bottom leg 92 engaging the bottom face of the plate 19 and a top leg 93 engaging the top face of the plate. This top leg 93 is recessed at 94 to conform with the inside edge of the ledge or rib 84 of the plate 20. The top leg 93 underlies this ridge and its thickness will increase the effective depth of the recess 83 and will also prevent excessive pressure exerted on the front end of the apparatus from thinning down the tortilla patty more at the front end than at the rear end. The spacer shim 91 is particularly useful where the surfaces of both the base plate and top plate are flat. The shim can easily be slipped on and off the plate 19 as desired.

The downward pressure exerted manually on the hand grip 69 is applied only momentarily as described above in connection with the appliance of FIGS. 1 to 3 and then the handle is partially raised during the remainder of the baking or cooking operation.

The bar 15 may be from two to three feet in length with the central mounting block 70 receiving the bar close to the pivot block 16 so that the lever arm length between the grip 69 and the block 70 is much greater than the lever arm length between the pivot 17 and the block 70, thereby affording a second class lever advantage so that relatively light downward pressure loads applied to the handle 69 will exert high pressures on the block 70 and suspended plate 70. Loading pressures of 60 pounds and higher are thus easily applied to the dough patty.

From the above descriptions it will be understood that this invention provides an apparatus or appliance especially adapted for home use to quickly and easily produce partially or fully cooked or baked thin pastry wafers from dough patties without heretofore required rolling or flour dusting.

I claim as my invention:

1. An apparatus for simultaneously spreading, flattening, forming and partially cooking flour tortillas to a set thin condition and an initial dough patty condition without flour dusting of the apparatus or patty which comprises a base heating unit, a lever bar, a movable heating unit for overlying the base unit, a hinge connecting one end of said lever bar to oone end of said base unit, a first flat heat conductive plate underlying said movable heating unit, a central bolt suspending said first flat plate and said movable heating unit from said lever bar accommodating free tilting of said first flat plate in all directions, a second heat conductive plate mounted on top of said base unit, means fixedly securing said second flat plate to said base unit, said hinge accommodating swinging of said movable heating unit to move asid first flat plate from an upright position to a horizontal position in contact with said second flat plate whereby a tortilla dough patty placed on said second flat plate may be flattened to a very thin condition, a handle pivotally mounted on said lever bar at the front of said movable heating unit and extending outwardly from the free end of said movable heating unit oppposite said hinged end to provide with the lever bar a lever of the second class advantage, said handle having a lip engaging the lower heating plate to exert leverage to press the top plate downwardly toward the bottom plate when the handle is pressed down, heat insulating means on said handle permitting it to be grasped and pressed downwardly without receiving the heat from the movable and base heating units, said base heating unit having an unheated portion extending outwardly under said handle when the movable heating unit is in a closed operating position to resist tilting of the apparatus upon application of downward pressure to the handle for flattening the dough patty to a thin, flat condition, and switch means on said outwardly extending base portion for activating said base and movable heating units.

2. The apparatus of claim 1 wherein the handle projects from the movable heating unit a sufficient distance to provide increased leverage for pressing the top plate against the bottom plate.

3. The apparatus of claim 1 wherein the movable heating unit is suspended from a lever bar, the hinge connects one end of the lever bar to the base unit, the first flat plate is suspended at the center thereof from said lever bar and the pivoted handle is mounted on a forwardly projecting portion of the lever bar.

4. A device adapted for preparing flour tortillas from dough patties comprising a base having an electrically heated base plate on the top thereof, a pivot mounting on said base plate, a lever bar securely fastened at one end to said pivot mounting, an electrically heated top plate suspended from said lever bar close to the pivot mounting, said lever bar extending forwardly from said suspended top plate, a first handle on the forwardly projecting end of the lever bar adapted to be pressed downwardly to provide a lever of the second class advantage for developing high pressure flattening of a dough patty between the plates, and a second handle on the lever bar projecting rearwardly from the pivot mounting thereof adapted to be pressed downwardly with the first handle to prevent the base from tipping.

5. The device of claim 4 wherein the lever bar has a portion extending rearwardly from the pivot receiving the second handle and forming a support for holding the lever bar in vertical, open position.

6. The device of claim 4 including a shim clip removably mounted on the base plate to space the top plate from the base plate.

7. The device of claim 4 including a flat plate extending rearwardly from the bottom of the base unit under the second handle, and means for anchoring said flat plate to a fixed support to prevent tilting of the base unit when the first handle is pressed downwardly.

8. A device adapted for preparing flour tortillas from dough patties comprising a base unit having an electrically heated base plate on the top thereof, a lever bar pivotally mounted at one end of said base unit, an electrically heated top plate tiltably suspended from said lever bar close to said pivot mounting, said tiltable suspension of said top plate accommodating free tilting of the top plate in all directions, said lever bar extending forwardly from said tiltably suspended top plate, a handle on the forwardly projecting end of the lever bar adapted to be pressed downwardly to provide a lever of the second class advantage for developing high pressure flattening of a dough patty between the plates, said tiltably suspended top plate tilting to accommodate unevenness in the thickness of a dough patty between the electrically heated plates to spread and sest the dough patty to the desired thickness and produce a wafer sheet of uniform thickness from said dough patty, and electric control switches on said base unit for regulating the temperatures of said electrically heated plates to set the dough of the thin wafer sheet.

9. The device of claim 8 wherein the base plate has spaced rearwardly projecting integral ears, the lever bar has a block secured thereon and depending therefrom between said ears, a hinge pin projects from both ends of the block over the ears, and bearing blocks overlie the projecting portions of the hinge pin and are secured to the ears.

10. The device of claim 8 including a rearwardly projecting flat foot plate on the base unit, and means for locking said foot plate to a support for the device to prevent tilting of the device when downward pressure is applied to said handle.

11. The device of claim 8 wherein the switches separately control the temperatures of the base plate and the pivotally suspended top plate.

12. The device of claim 8 wherein the base unit has a portion projecting forwardly beyond the base plate underlying the lever bar and providing additional support for the base unit.

13. The device of claim 8 wherein the top plate is centrally recessed and the base plate is planar to control the thickness of the flattened wafer sheet on the base plate.

14. An electrical appliance for simultaneously spreading, flattening, forming, and partially cooking flour tortillas to a set, thin wafer condition from an initial dough patty condition without rolling or flour dusting of the apparatus or patty which comprises a base member having an electrically heated flat base plate on the top thereof, a pivot mounting on said base plate, an elongated lever bar securely fastened to said pivot mounting, an electrically heated top plate freely tiltably suspended at the center thereof from said lever bar close to the pivot mounting to wobble in all directions, said lever bar having a forwardly projecting portion substantially longer than the length of the lever bar portion between the pivot and the suspension for the top plate, an insulated hand grip on the forward end of said extended lever portion adapted to be manually grasped and pressed downwardly to exert a high load on a dough patty between said electrically heated plates, said tiltably suspended top plate tilting to accommodate unevenness in the thickness of a dough patty between said plates for distributing the high load and produce a thin wafer sheet of uniform thickness from the dough patty, and control switches regulating the temperature of said electrically heated plates to spread and set the dough patty to the desired thickness.

15. The apparatus of claim 14 wherein the top plate has a mounting block secured at the center of the top face thereof, an annular heating member overlies the top plate and receives the mounting block therethrough, the mounting block has a recess receiving the lever bar, a bolt is secured in the mounting block and extends freely through the lever bar to provide the freely tiltable suspension, and a cover member is mounted on the bolt to overlie the annular heating element.

* * * * *